(12) United States Patent
Fan

(10) Patent No.: US 6,686,715 B2
(45) Date of Patent: Feb. 3, 2004

(54) MOTOR CONTROL DEVICE

(75) Inventor: Davis Fan, Taipei (TW)

(73) Assignee: Champion Microelectronic Corp., Hsinchu (TW)

( * ) Notice: Subject to any disclaimer, the term of this patent is extended or adjusted under 35 U.S.C. 154(b) by 34 days.

(21) Appl. No.: 10/170,698

(22) Filed: Jun. 14, 2002

(65) Prior Publication Data
US 2003/0230995 A1 Dec. 18, 2003

(51) Int. Cl.[7] ............................. H02P 1/04; H02P 7/00
(52) U.S. Cl. .................. 318/461; 318/138; 318/254; 318/430; 318/432; 318/434; 318/439; 318/700; 318/715
(58) Field of Search .................. 318/138, 254, 318/430, 432, 434, 700, 461, 439, 715

(56) References Cited

U.S. PATENT DOCUMENTS

| 4,879,498 A | * | 11/1989 | Shinohara et al. | .......... 318/254 |
| 5,473,725 A | * | 12/1995 | Chen et al. | .......... 318/254 |
| 5,619,109 A | * | 4/1997 | Cameron et al. | .......... 318/375 |
| 5,631,999 A | * | 5/1997 | Dinsmore | .......... 388/805 |
| 5,936,365 A | * | 8/1999 | Li et al. | .......... 318/439 |
| 6,078,158 A | * | 6/2000 | Heeren et al. | .......... 318/430 |
| 6,084,364 A | * | 7/2000 | Menegoli | .......... 318/254 |
| 6,396,229 B1 | * | 5/2002 | Sakamoto et al. | .......... 318/439 |
| 6,456,030 B1 | * | 9/2002 | Masaki et al. | .......... 318/700 |
| 6,559,615 B2 | * | 5/2003 | Sethi | .......... 318/565 |
| 6,566,832 B2 | * | 5/2003 | Atace | .......... 318/560 |

* cited by examiner

Primary Examiner—Robert Nappi
Assistant Examiner—Tyrone Smith
(74) Attorney, Agent, or Firm—Rosenberg, Klein & Lee

(57) ABSTRACT

The present invention provides a motor control device, which comprises a signal control circuit having an input pin to output different motor drive signals according to input electronic signals. The signal control circuit is also protected for over current and over voltage. Two switch circuits of brake before make configuration are connected to the signal control circuit. An inverter is arranged between the two switch circuits. The inverter switches the motor drive signal among the two switch circuits and transmits it to a driver, which is connected to a motor drive circuit. A power source circuit is connected to the motor drive circuit to provide electricity for the motor drive circuit. A back electromotive force (back EMF) component for detection and control of the rotation speed of motor is disposed in the driver. The motor control device of the present invention has the advantages of reduced number of pins and shrunk volume.

4 Claims, 1 Drawing Sheet

MOTOR CONTROL DEVICE

FIELD OF THE INVENTION

The present invention relates to a microprocessor and, more particularly, to a micro-processing control device of a motor.

BACKGROUND OF THE INVENTION

Along with progress of high scientific technology, the development of many electronic products tends to multi-functionality and miniaturization. Therefore, for many motor-driven electronic products like recorders, compact disk players, and digital still cameras, the miniaturization and multi-functionality of the motor control device and driver have become important issues in motor design.

In the control device of a common motor, in consideration of the requirements of forward rotation, reverse rotation, and braking of the motor, three signal input pins are required in an IC chip to provide signals for forward rotation, reverse rotation, and braking, respectively. With also a power input, a ground, a positive electrode and a negative electrode of the motor, and control signals, the whole motor control circuit at least requires eight pins in the IC chip so that the volume of the manufactured IC chip will be too large and cannot meet the requirement of miniaturized electronic products. Besides, in order that the rotation speed of an operating motor can be detected and adjusted, the control device is usually electrically connected to a Hall effect device. In addition to the design of the above signal control device and the Hall effect device, it is also necessary to arrange a drive current switch like a MOSFET in the motor to provide a power source for the motor. Because the components are complicated and the MOSFET is bulkier, the above conventional design cannot apply to drive and control components of motor in common miniaturized products, i.e., the practical value is low.

Accordingly, the present invention aims to propose a motor control device having a small volume and multiple functions.

SUMMARY AND OBJECTS OF THE PRESENT INVENTION

The primary object of the present invention is to propose a motor control device, which uses the same pin as an input contact of rotation direction and braking signals of a motor to have the advantages of reduced number of pins and shrunk volume of the motor control device.

Another object of the present invention is to propose a motor control device, which has a small volume, a simple architecture, and can adjust and control the rotation speed of a motor.

According to the present invention, a motor control device comprises a signal control circuit having an input pin to output different motor drive signals according to the input electronic signals. The signal control circuit is electrically connected to an over current protection circuit and an over voltage protection circuit. Two switch circuits of brake before make configuration are connected to the signal control circuit. An inverter is arranged between the two switch circuits. The inverter switches the motor drive signal among the two switch circuits and transmits it to a driver, which is connected to a motor drive circuit. A power source circuit is connected to the motor drive circuit to provide electricity for the motor drive circuit. A back electromotive force (back EMF) component for detection and control of the rotation speed of motor is disposed in the driver.

The various objects and advantages of the present invention will be more readily understood from the following detailed description when read in conjunction with the appended drawings, in which:

DETAILED DESCRIPTION OF PREFERRED EMBODIMENT

Figure 1:
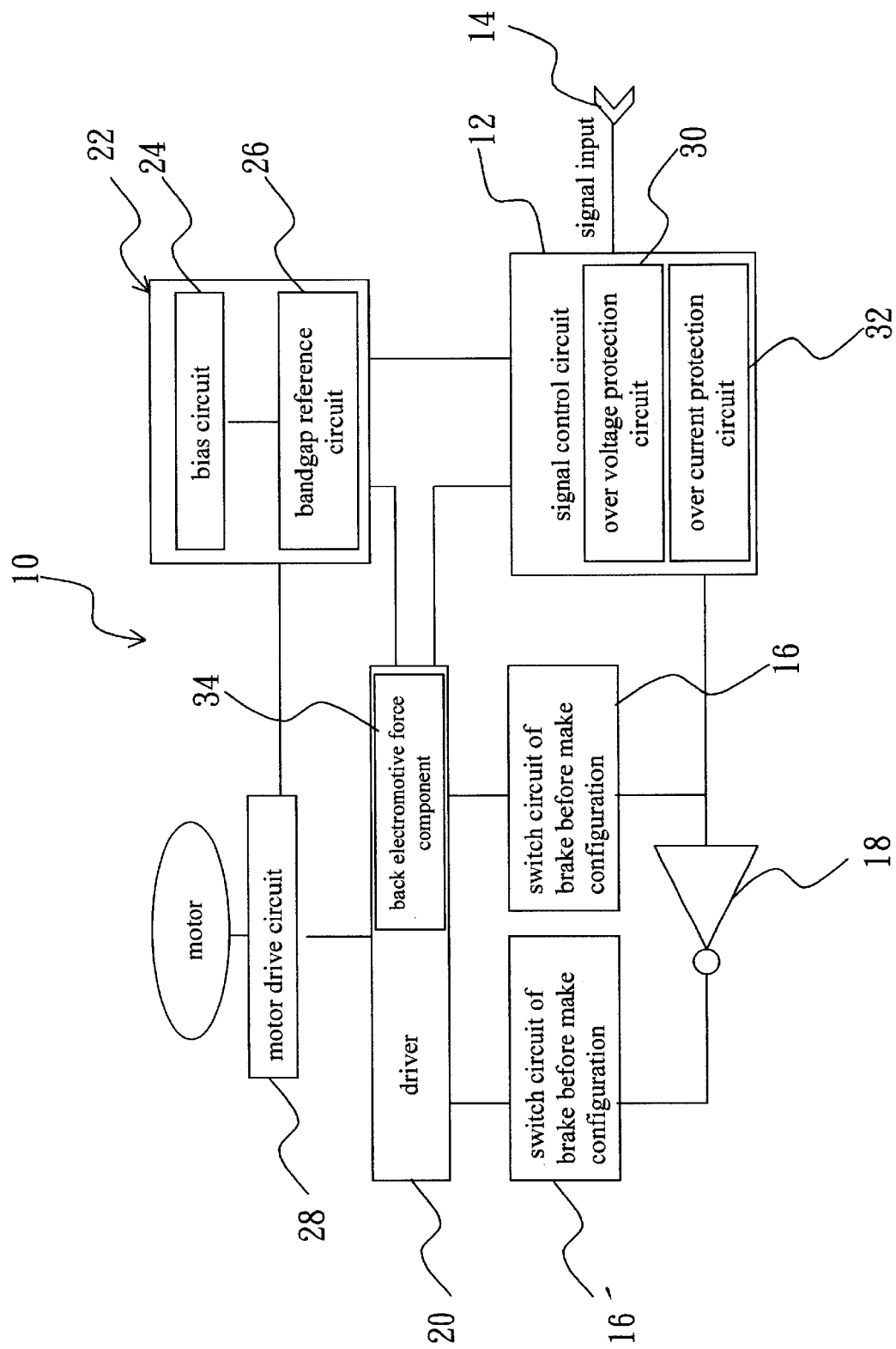
FIG. 1 is a structure block diagram of the present invention.

The present invention is characterized in that a signal control circuit and a motor drive circuit are integrated into a motor control device, and the same input pin is used as an input contact of rotation direction and braking signals of a motor to reduce the number of pins of the signal control circuit and to miniaturize the product.

As shown in FIG. 1, a motor control device 10 comprises a signal control circuit 12 having an input pin 14 for input of an electronic signal so that the signal control circuit can output different motor drive signals according to input electronic signals. Two switch circuits 16 and 16' are connected to the signal control circuit 12. An inverter 18 is disposed between the two switch circuits 16 and 16'. The inverter 18 switches the motor drive signal among the two switch circuits 16 and 16' and transmits it to a driver 20, which is connected to a motor drive circuit 28. The switch circuits 16 and 16' are of break before make configuration, wherein the current connection of the two switch circuits 16 and 16' is broken before the next time of connection of the two switch circuits 16 and 16' to avoid short circuit between signals. A power source circuit 22 comprising a bias circuit 24 and a bandgap reference circuit 26 is connected to the motor drive circuit 28 to provide electricity for the motor drive circuit 28.

The above signal control circuit 12 is a three-phase control circuit. A comparison voltage, generally being half the input voltage (e.g., 2.5V), is set in the signal control circuit 12. If the voltage of the electronic signal from the input pin 14 is larger than the comparison voltage, the motor drive signal is set to be a signal for driving the motor to make forward rotation. If the voltage of the electronic signal from the input pin 14 is smaller than the comparison voltage, the motor drive signal is set to be a signal for driving the motor to make reverse rotation. If the input electronic signal is a voltage pulse letting the voltage of the electronic signal be raised from a value smaller than the comparison voltage to a value larger than the comparison voltage, the motor drive signal is set to be a signal for braking the motor. The input pin 14 of the signal control circuit 12 is also electrically connected to an over voltage protection circuit 30 and an over current protection circuit 32 to provide protection for the signal control circuit 12.

A back electromotive force (back EMF) component 34 for detection of the rotation speed of motor is disposed in the driver 20 so that the motor drive circuit 28 can further adjust or control the rotation speed of the motor.

In the present invention, the signal control circuit, the driver, and the power source circuit are integrated into an IC chip, and one pin of the IC chip is used as an input contact of the signal control circuit. Electronic signals from the input pin are exploited to control forward rotation, reverse rotation, and braking of a motor so as to effectively reduce the number of pins of the IC chip. Moreover, a large-current power source circuit is fabricated on the IC chip to overcome the drawback of a bulkier control device due to an external MOSFET in the prior art. Besides, the back EMF component of the present invention can be used to replace the conventional Hall effect device so as to overcome the difficulty of miniaturization due to complicated components in the motor control device.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A motor control device disposed on an IC chip and used to control the action of a motor, said motor control device comprising:

a signal control circuit having at least an input pin to output a motor drive signal according to an electronic signal from said input pin;

two switch circuits connected to said signal control circuit, an inverter being arranged between said two switch circuits to switch said motor drive signal among said two switch circuits, each of said switch circuits being of brake before make configuration;

a driver electrically connected to a motor drive circuit, said driver driving said motor to act according to said motor drive signal, a power source circuit being connected to said motor drive circuit to provide electricity for said motor drive circuit; and a back electromotive force component disposed in said driver to detect and adjust the action of said motor.

2. The motor control device as claimed in claim 1, wherein said signal control circuit is also electrically connected to an over voltage protection circuit and an over current protection circuit.

3. The motor control device as claimed in claim 1, wherein said power source circuit comprises a bandgap reference circuit and a bias circuit.

4. The motor control device as claimed in claim 1, wherein said signal control circuit is a three-phase control circuit.

* * * * *